US012174775B1

(12) United States Patent
Nujetti et al.

(10) Patent No.: US 12,174,775 B1
(45) Date of Patent: Dec. 24, 2024

(54) APPARATUSES, SYSTEMS, AND METHODS FOR MULTI-LANE DATA BUS INVERSION

(71) Applicants: Advanced Micro Devices, Inc., Santa Clara, CA (US); ATI Technologies ULC, Markham (CA)

(72) Inventors: Padmini Nujetti, Markham (CA); Chao Yu, Markham (CA); Michael Tresidder, Austin, TX (US); Daniel McLean, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 13 days.

(21) Appl. No.: 18/083,738

(22) Filed: Dec. 19, 2022

(51) Int. Cl.
*G06F 13/42* (2006.01)

(52) U.S. Cl.
CPC ............................. *G06F 13/4204* (2013.01)

(58) Field of Classification Search
CPC .. G06F 13/1668; G06F 13/42; G06F 13/4068; G06F 13/4204; G06F 13/4208; G11C 7/1006
See application file for complete search history.

(56) References Cited

U.S. PATENT DOCUMENTS

2018/0357188 A1* 12/2018 Brief .................. G06F 13/1668

\* cited by examiner

*Primary Examiner* — Ernest Unelus
(74) *Attorney, Agent, or Firm* — Greenberg Traurig, LLP

(57) ABSTRACT

The disclosed computer-implemented method for multi-lane data bus inversion can include receiving data for transmission via a plurality of data lanes, each data lane corresponding to one of a plurality of inversion bits, and, for each data lane within the plurality of data lanes, applying the corresponding inversion bit to each bit within the data lane. Various other methods, apparatuses, and systems are also disclosed.

17 Claims, 9 Drawing Sheets

APPARATUSES, SYSTEMS, AND METHODS FOR MULTI-LANE DATA BUS INVERSION

BACKGROUND

Data bus inversion encoding can reduce power consumption by reducing the rate at which transmitted bits toggle from one cycle to the next to, at most, half the total number of bits.

BRIEF DESCRIPTION OF THE DRAWINGS

The accompanying drawings illustrate a number of example implementations and variations and are a part of the specification. Together with the following description, these drawings demonstrate and explain various principles of the present disclosure.

Figure 1:
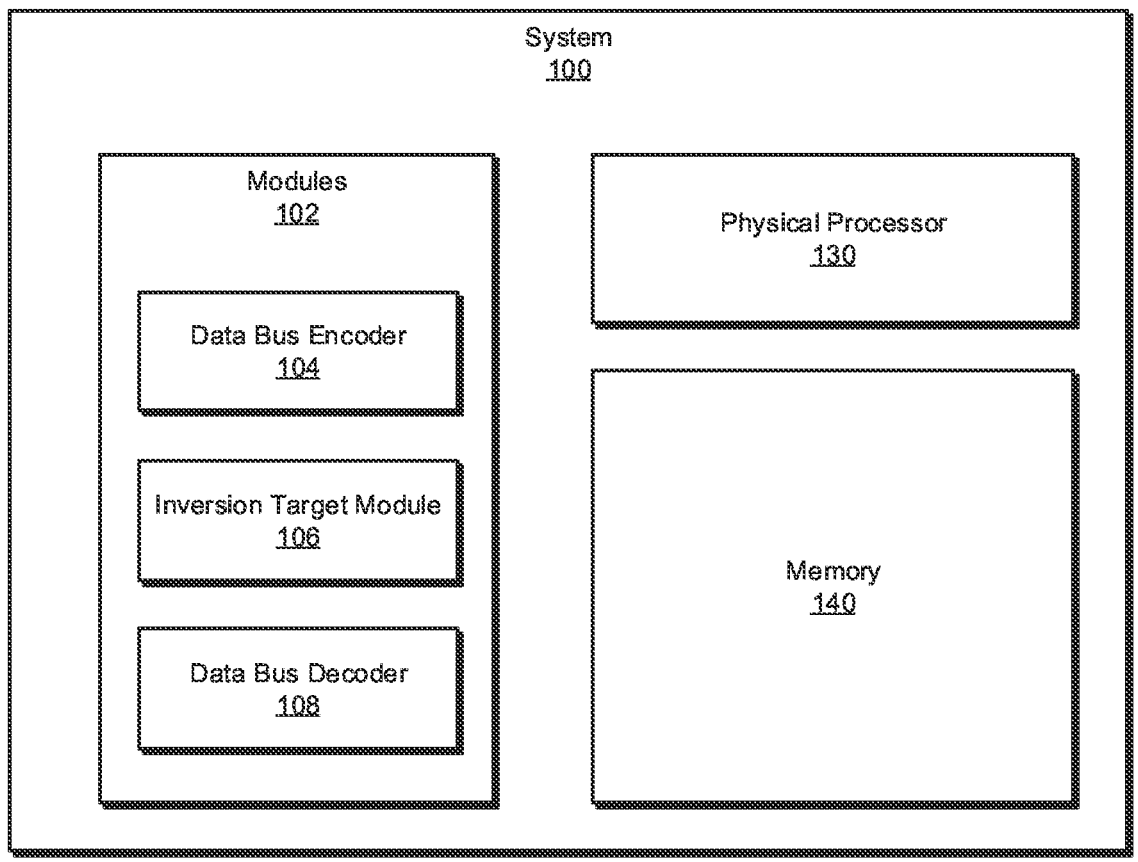
FIG. 1 is a block diagram of an example system for multi-lane data bus inversion.

Throughout the drawings, identical reference characters and descriptions indicate similar, but not necessarily identical, elements. While the example implementations and variations described herein are susceptible to various modifications and alternative forms, specific implementations and variations have been shown by way of example in the drawings and will be described in detail herein. However, the example implementations and variations described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for multi-lane data bus inversion. Data bus inversion encoding can reduce power consumption by reducing the toggle rate of bits to, at most, half the total number of bits. However, it can be beneficial to target different ranges of toggle rates. For example, a toggle rate that is too low could contribute to voltage droop which could, in some scenarios, lead to undesired behaviors, including data corruption. To achieve different possible ranges of toggle rates, a data bus can include multiple inversion bits. Each inversion bit can target a subset of bits, and, collectively, the inversion bits can be set or not in order to achieve an amount of toggling with a desired range. For example, with two inversion bits, a toggle rate range of 25%-50% is achievable, which can still reduce power consumption while also avoiding voltage droop.

By allowing more fine-tuned ranges of possible toggle rates, the apparatuses and methods described herein can provide greater control over both power consumption and other facts, such as voltage droop. Thus, a data bus can consume relatively low power while avoiding consequences of voltage droop, such as out-of-spec behaviors.

In one implementation, an apparatus for multi-lane data bus inversion can include a data bus encoder that is configured to receive data for transmission via a plurality of data lanes, where each data lane corresponds to one of a plurality of inversion bits. The data bus encoder can also be configured to, for each data lane within the plurality of data lanes, apply the corresponding inversion bit to each bit within the data lane.

In some implementations, the apparatus can also include an inversion target module that is configured to, for each data lane, determine a toggle number that specifies a number of bits within the data lane set to toggle with respect to a previous transmission and then set a value for the corresponding inversion bit such that, when the data bus encoder applies the plurality of inversion bits to the plurality of data lanes, an average toggle rate across the plurality of data lanes falls within a target toggle rate window.

In some implementations, the minimum toggle rate of the target toggle rate window can be greater than zero. Additionally or alternatively, the target toggle rate window can be adjustable. In some implementations, adjusting the target toggle rate window can be based at least in part on a power-usage setting. Additionally or alternatively, adjusting the target toggle rate window can be based at least in part on a voltage-level setting. In some implementations, the target toggle rate window can be from a 25 percent toggle rate to a 50 percent toggle rate.

In some implementations, the average toggle rate can also include a toggle rate of the plurality of inversion bits.

Features from any of the implementations and variations described herein can be used in combination with one another in accordance with the general principles described herein. These and other implementations, variations, features, and advantages will be more fully understood upon reading the following detailed description in conjunction with the accompanying drawings and claims.

Figure 2:
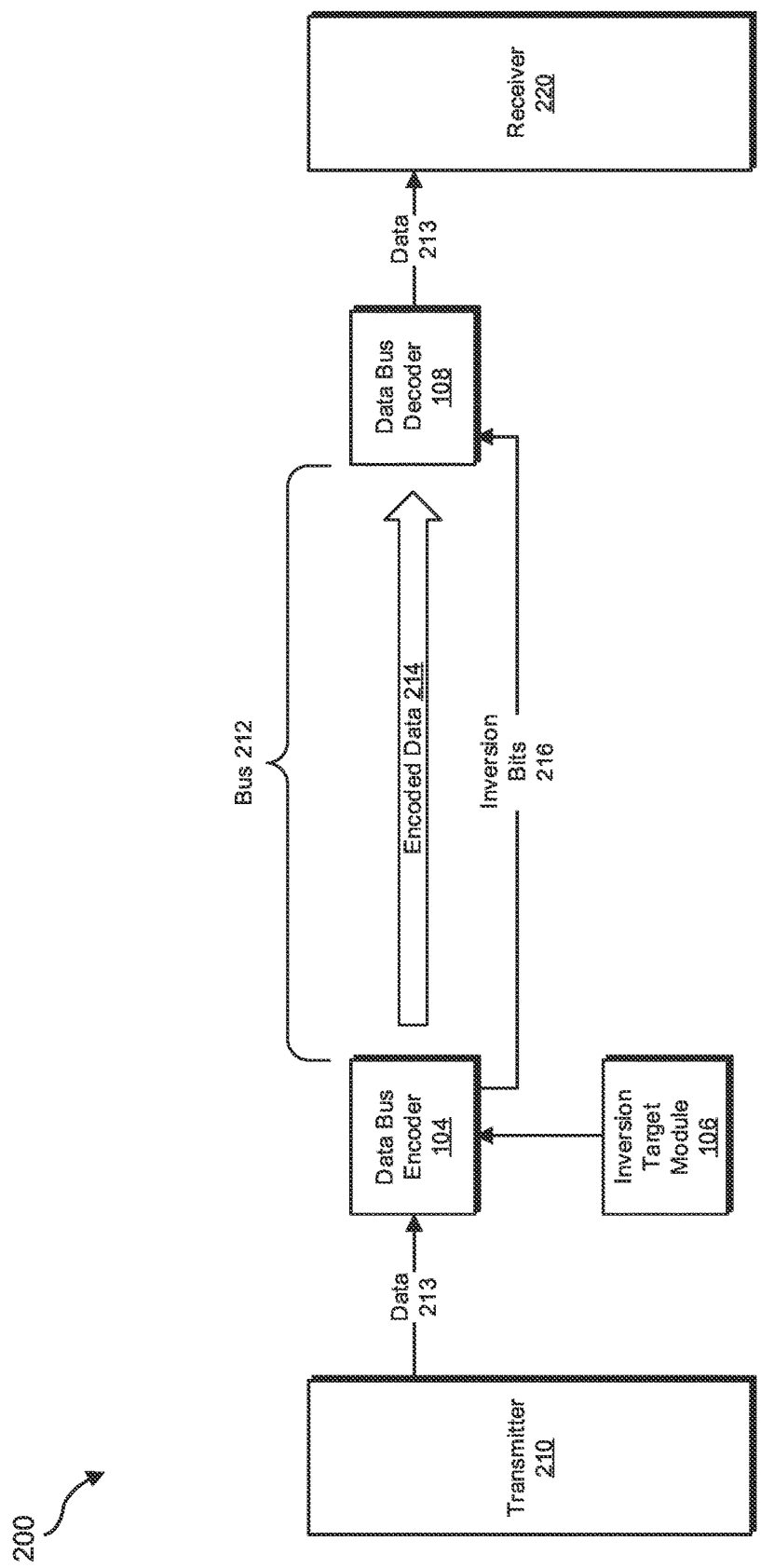
FIG. 2 is a block diagram of an additional example system for multi-lane data bus inversion.
Figure 3:
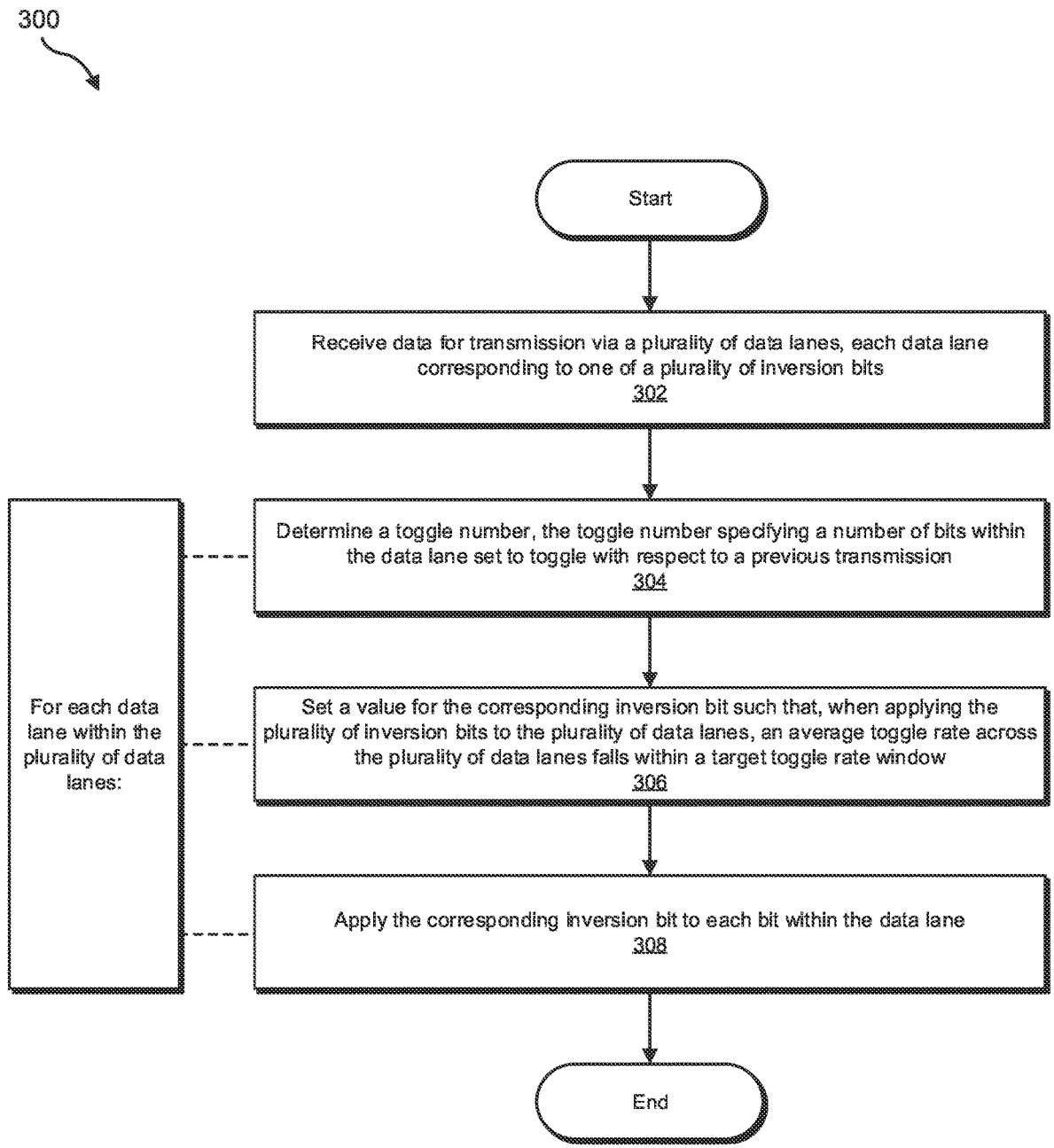
FIG. 3 is a flow diagram of an example method for multi-lane data bus inversion.
Figure 4:
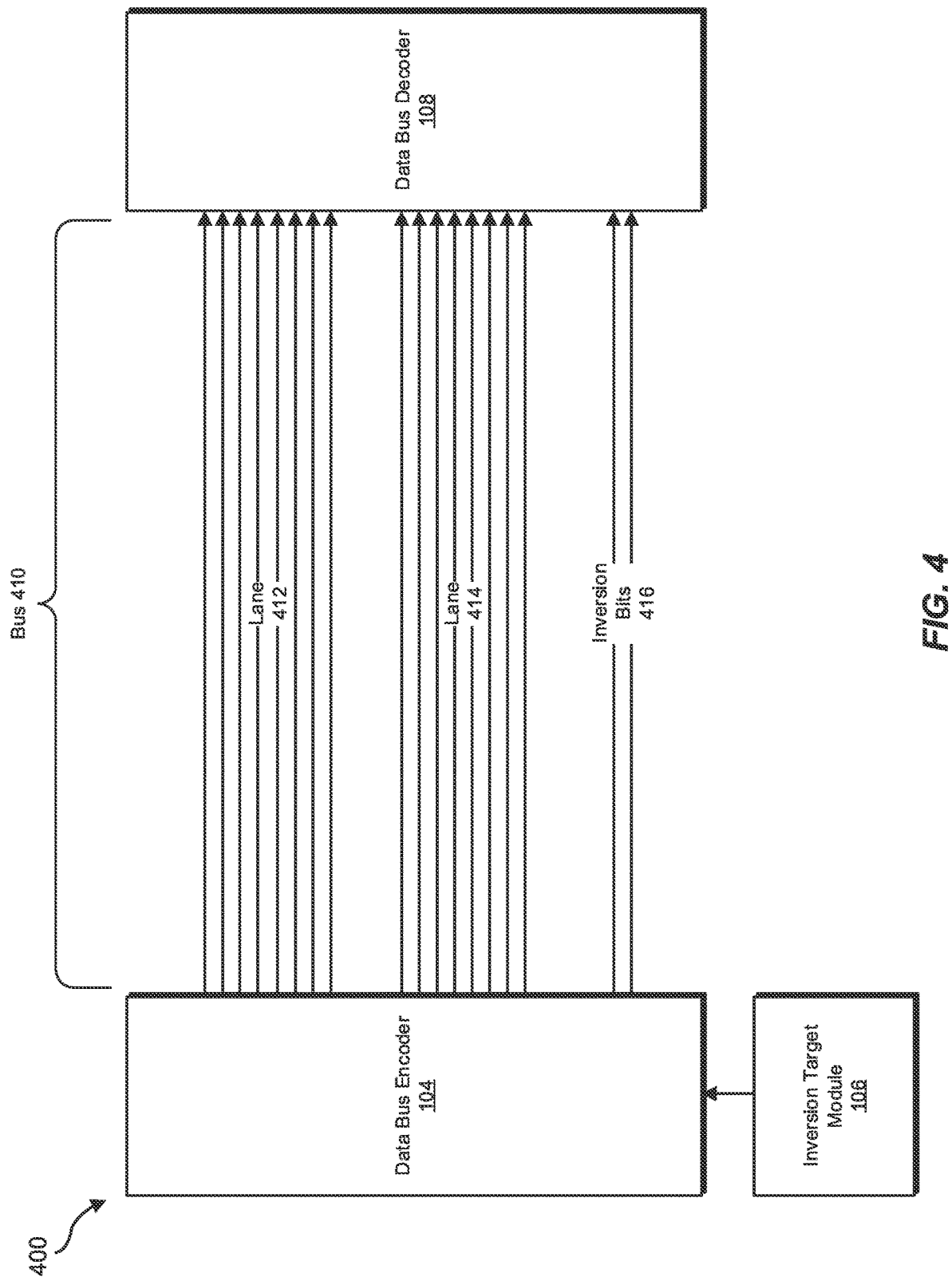
FIG. 4 is a diagram of an example system for multi-lane data bus inversion.

The following will provide, with reference to FIGS. 1, 2, and 4, detailed descriptions of example systems for multi-lane data bus inversion. Detailed descriptions of corresponding computer-implemented methods will also be provided in connection with FIG. 3. In addition, detailed descriptions of example states of systems for multi-lane data bus inversion will be provided in connection with FIGS. 5-9.

FIG. 1 is a block diagram of an example system 100 for multi-lane data bus inversion. As illustrated in this figure, example system 100 can include one or more modules 102 for performing one or more tasks. As will be explained in greater detail below, modules 102 can include a data bus encoder 104, an inversion target module 106, and a data bus decoder 108. Although illustrated as separate elements, one or more of modules 102 in FIG. 1 can represent portions of a single module or application.

In certain implementations, one or more of modules 102 in FIG. 1 can represent one or more circuits that, when activated, can perform one or more tasks. Additionally or alternatively, one or more of modules 102 can represent one or more firmware-based programs and/or firmware devices. In some examples, one or more of modules 102 can represent one or more software applications or programs that, when executed by a computing device, can cause the computing device to perform one or more tasks.

As illustrated in FIG. 1, example system 100 can also include one or more memory devices, such as memory 140. Memory 140 generally represents any type or form of volatile or non-volatile storage device or medium capable of storing data and/or computer-readable instructions. In one example, memory 140 can store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 can also include one or more physical processors, such as physical processor 130. Physical processor 130 generally represents any type or form of hardware-implemented processing unit capable of interpreting and/or executing computer-readable instructions. In one example, physical processor 130 can access and/or modify one or more of modules 102 stored in memory 140. Additionally or alternatively, physical processor 130 can execute one or more of modules 102 to facilitate multi-lane data bus inversion. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 in FIG. 1 can be implemented in a variety of ways. For example, all or a portion of example system 100 can represent portions of example system 200 in FIG. 2. As shown in FIG. 2, system 200 can include a transmitter 210 in communication with a receiver 220 via a bus 212.

Transmitter 210 generally represents any type or form of device capable of transmitting data by a bus to another device. For example, transmitter 210 can include a memory device. Additional examples of transmitter 210 include, without limitation, a processor, a hardware accelerator, a processing module (e.g., a chiplet), a bus bridge, variations or combinations of one or more of the same, or any other suitable device. In some implementations, transmitter 210 can also receive data by a bus from another device (e.g., from receiver 220).

Receiver 220 generally represents any type or form of device capable of receiving data by a bus from another device. For example, receiver 220 can include a processor. Additional examples of receiver 220 include, without limitation, a memory device, a hardware accelerator, a processing module (e.g., a chiplet), a bus bridge, variations or combinations of one or more of the same, or any other suitable device. In some implementations, receiver 220 can also transmit data by a bus to another device (e.g., to transmitter 210).

Bus 212 generally represents any type or form of connection and/or communicative channel capable of transmitting data from one or more devices to one or more devices. In some implementations, as shown in FIG. 2, bus 212 can transmit encoded data 214. For example, transmitter 210 can provide data to data bus encoder 104, which can encode the data (based, e.g., one or more inversion bits 216 set by inversion target module 106), resulting in encoded data 214. Data bus decoder 108 can then decode encoded data 214.

While data bus encoder 104 and inversion target module 106 are illustrated as separate modules in communication with one another, it can be appreciated that, in some implementations, data bus encoder 104 and inversion target module 106 can represent portions of a single device. In addition, although inversion bits 216 are represented as being transmitted from data bus encoder 104 to data bus decoder 108, in some implementations inversion bits 216 can be transmitted from inversion target module 106 (e.g., which can have set inversion bits 216) directly to data bus decoder 108.

Many other devices or subsystems can be connected to system 100 in FIG. 1 and/or system 200 in FIG. 2. Conversely, all of the components and devices illustrated in FIGS. 1 and 2 need not be present to practice the implementations described and/or illustrated herein. The devices and subsystems referenced above can also be interconnected in different ways from that shown in FIG. 2. Systems 100 and 200 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for multi-lane data bus inversion. The steps shown in FIG. 3 can be performed by any suitable computer-executable code and/or computing system, including system 100 in FIG. 1, system 200 in FIG. 2, and/or variations or combinations of one or more of the same. In one example, each of the steps shown in FIG. 3 can represent an algorithm whose structure includes and/or is represented by multiple sub-steps, examples of which will be provided in greater detail below.

As illustrated in FIG. 3, at step 302 one or more of the systems or apparatuses described herein can receive data 213 for transmission via a plurality of data lanes, each data lane corresponding to one of a plurality of inversion bits. For example, data bus encoder 104 can, as part of system 200 in FIG. 2, receive data 213 from transmitter 210 for transmission to receiver 220 via bus 212 (which can be composed of a plurality of data lanes).

As used herein, the term "data bus" can generally refer to any communication system that is capable of transferring data between components within a computing system. Thus, the term "data bus" can refer to any suitable bus including, without limitation, a data bus, an address bus, or a control bus.

As used herein, the term "inversion bit" can refer to any data line, flag, and/or signal used for encoding data transmitted on a data bus by inverting one or more bits of the data. As used herein, the term "data lane" can refer to any grouping of data lines within a bus (e.g., a physical grouping, a logical grouping, etc.). In some implementations, an inversion target module, a data bus encoder, and/or a data bus decoder will recognize the partition of a data bus into data lanes. Thus, as will be explained in greater detail below, lines of a data bus (e.g., each line capable of transmitting one bit of information) can be grouped into one or more data lanes, and a single inversion bit can be used for encoding bits corresponding to one lane of the bus but not to other lanes of the bus (and, e.g., each lane can have at least one or exactly one corresponding inversion bit).

Data bus encoder 104 can receive data 213 to transmit in any suitable context. In some examples, data bus encoder 104 can receive data 213 directly from transmitter 210. In some implementations, data bus encoder 104 can receive data 213 from inversion target module 106 (which can, e.g., have received data 213 from transmitter 210). In various implementations, data bus encoder 104 can receive data to transmit once per computing cycle. In some implementations, data bus encoder 104 and/or inversion target module 106 can be physically and/or communicatively coupled to transmitter 210.

Returning to FIG. 3, at step 304 one or more of the systems or apparatuses described herein can, for each data lane within the plurality of data lanes, determine a toggle number, the toggle number specifying a number of bits within the data lane set to toggle with respect to a previous transmission. For example, inversion target module 106 can, as part of system 200 in FIG. 2, determine, for each data lane, a toggle number that specifies a number of bits within the data lane set to toggle with respect to a previous transmission.

Inversion target module 106 can determine the toggle number for each data lane in any suitable manner. In some examples, inversion target module 106 can generate a representation of a count of the number of bits set to toggle within the data lane. In some variations, inversion target module 106 can generate a representation of a proportion of the number of bits set to toggle within the data lane.

In some implementations, inversion target module 106 can buffer data transmitted each cycle. For example, inversion target module 106 can buffer the encoded data as transmitted each cycle (and, in some variations, buffer the inversion bits and/or other encoding information). Additionally or alternatively, inversion target module 106 can buffer the data before encoding, along with the inversion bits and/or other encoding information. On a subsequent cycle, inversion target module 106 can compare the data that was transmitted on the previous cycle with data to be transmitted on the current cycle to determine the number of bits set to toggle.

In various implementations, inversion target module 106 can compare the data transmitted on the previous cycle with the data set to be transmitted using any inversion encoding for each (e.g., the actual inversion encoding used for the data transmitted on the previous cycle and the same inversion encoding for the data set to be transmitted, no inversion encoding for either transmission, etc.). Then, to yield the appropriate count, inversion target module 106 directly use the comparison or use the complement of the comparison as appropriate. For example, if 5 out of 8 bits in a data lane were set to flip assuming preserving an inversion across both cycles, a comparison that preserves the inversion can yield a count of 5, while a comparison that does not preserve the inversion for the second cycle can yield a count of 3, which is the complement of 5 in an 8-bit scheme.

Returning to FIG. 3, at step 306 one or more of the systems or apparatuses described herein can, for each data lane within the plurality of data lanes, set a value for the corresponding inversion bit such that, when applying the plurality of inversion bits to the plurality of data lanes, an average toggle rate across the plurality of data lanes falls within a target toggle rate window. For example, inversion target module 106 can, as part of system 200 in FIG. 2, determine, for each data lane, set a value for a corresponding inversion bit within inversion bits 216 such that, when applying inversion bits 216 to result in encoded data 214, an average toggle rate across bus 212 falls within a target toggle rate window.

Inversion target module 106 can generate inversion bit values for corresponding data lanes in any suitable manner. As can be appreciated, a variety of processes and circuits can achieve an average toggle rate within a target toggle rate window when multiple inversion bits are used. In one example, inversion target module 106 can calculate the average toggle rate for each permutation of inversion bits and select a permutation of inversion bits that achieves an average toggle rate that falls within a target toggle rate window. As can be appreciated, assuming data lanes of equal width (e.g., the same number of data lines in each lane), the sizes of possible toggle rate windows can be $½^n$ of all possibilities, where n is the number of inversion bits. Thus, for example, with two inversion bits, a toggle rate window of 25-50% can be possible, thereby potentially avoiding problematic levels of voltage droop while also limiting power consumption. With three or more inversion bits, there can be narrower potential toggle rate windows.

Inversion target module 106 can determine the target toggle rate window in any suitable manner. In some implementations, the target toggle rate window can be fixed in the circuitry and/or software of inversion target module 106 (e.g., hardwired and/or hardcoded). In some implementations, the target toggle rate window can be set. For example, one or more systems or modules can dynamically configure inversion target module 106 to set the target toggle rate window. In some examples, one or more systems can automatically set and/or adjust the target toggle rate window based on one or more external factors. For example, a system (e.g., a power management system) can adjust the target toggle rate window based at least in part on a power-usage setting. Thus, for example, the target toggle rate window can be lowered (e.g., closer to an average toggle rate of zero) based at least in part on a power-usage setting to save power. In another example, a system can adjust the target toggle rate window based at least in part on a voltage-level setting. For example, the target toggle rate window can be raised and/or narrowed to reduce voltage droop and/or variation. Thus, for example, when a device proximate to the data bus would be negatively impacted by voltage droop (e.g., due to the device being active and/or operating in a particular mode), the target toggle rate window can be raised to avoid voltage droop than can cause out-of-specification behaviors by the device (including, e.g., data corruption).

In some variations, the minimum toggle rate of the target toggle rate window can be greater than zero. For example, the minimum toggle rate of the target toggle rate window can be fixedly set to a rate greater than zero. In other examples, the minimum toggle rate of the target toggle rate window can be dynamically adjusted to a rate greater than zero. In one example, the minimum toggle rate of the target toggle rate window can be about 25%. For example, the target toggle rate window can be from about a 25% toggle rate to about a 50% toggle rate.

While many examples provided herein discuss the average toggle rate as pertaining to the data bits transmitted via the data bus, in some variations the average toggle rate can include toggling of the inversion bits. Thus, for example, if the data bus were composed of two 8-bit data lanes (with two corresponding inversion bits), and data transmitted from one data cycle to the next were completely inverted (i.e., without regard to the inversion bits), then toggling the inversion bits would not result in an average toggle rate of zero, but rather 2/18, or about 11.1%. As can be appreciated, in these examples the possible target toggle rate windows are slightly adjusted to reflect the inclusion of the inversion bits, although the wider each data lane is, the less impact the inclusion of inversion bits in the average toggle rate has on the average toggle rate (and, so, on the possible target toggle rate windows).

Returning to FIG. 3, at step 308 one or more of the systems or apparatuses described herein can, for each data lane within the plurality of data lanes, apply the corresponding inversion bit to each bit within the data lane. Thus, for example, data bus encoder 104 can, as part of system 200 in FIG. 2, for each data lane within the plurality of data lanes, apply the corresponding inversion bit 216.

Data bus encoder 104 can apply the corresponding inversion bit to each data lane in any suitable manner. For example, data bus encoder 104 can apply an XOR operation between each bit in the data lane and the inversion bit corresponding to the data lane.

After encoding the data, data bus encoder 104 can transmit the encoded data (e.g., to data bus decoder 108). In addition, data bus encoder 104 can transmit the inversion bits (e.g., to data bus decoder 108) Data bus decoder 108 can decode the encoded data (e.g., by applying the inversion bits to the corresponding data lanes of the encoded data). Data bus decoder 108 can then transmit the decoded data to a receiving device.

FIG. 4 is a diagram of an example system 400 for multi-lane data bus inversion. As shown in FIG. 4, data bus encoder 104 can be communicatively connected to data bus decoder 108 via Bus 410. In addition, inversion target module 106 can be communicatively connected to data bus encoder 104. In one example, bus 410 can include a lane 412, a lane 414, and inversion bits 416. As illustrated in FIG. 4, lane 412 can have 8 data lines (e.g., capable of transmitting 8 bits of data), and lane 414 can have 8 data lines, thus resulting in a 16-bit bus (along with the two depicted inversion bits). Although bus 410 is depicted as 16-bit, and lanes 412 and 414 are each depicted as 8-bit, bus 410 and lanes 412 and 414 can be of any suitable size. Thus, for example, bus 410 can have a width of 8 bits, 32 bits, 64 bits, etc. Likewise, lanes 412 and 414 can each have a width of 4 bits, 16 bits, 32 bits, etc. Although bus 410 is depicted as being divided into two lanes, in some variations bus 410 can be divided in a greater number of lanes (3 lanes, 4 lanes, 6 lanes, 8 lanes, etc.), allowing for narrower target toggle rate windows.

Figure 5:
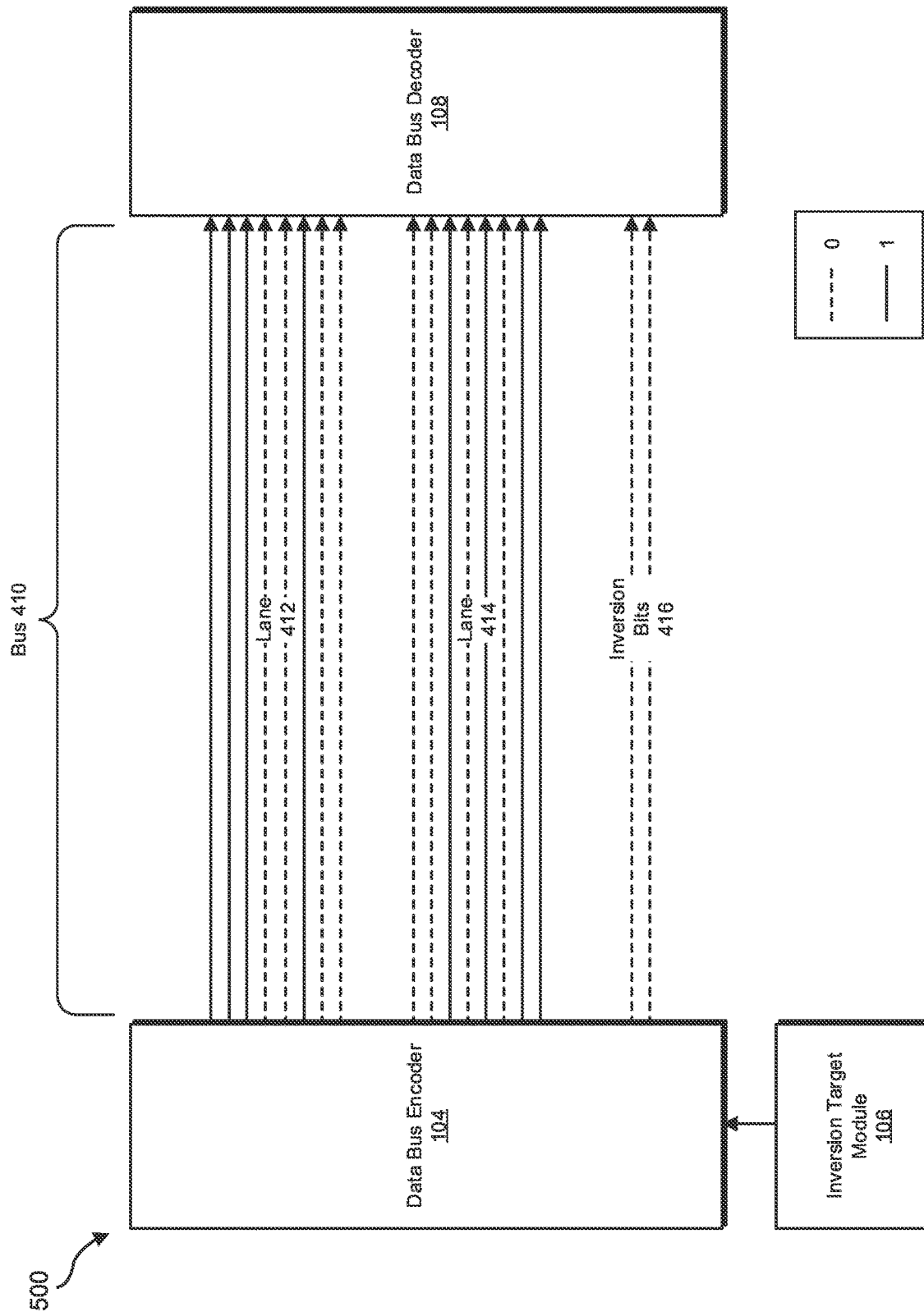
FIG. 5 is a diagram of an example multi-lane data bus state.

FIG. 5 is a diagram of an example multi-lane data bus state 500 in a preliminary cycle. As shown in FIG. 5, some bits in lane 412 are set to 0 and some bits are set to 1. Likewise, some bits in lane 414 are set to 0 and some bits are set to 1. Both inversion bits 416 in state 500 are set to 0.

Figure 6:
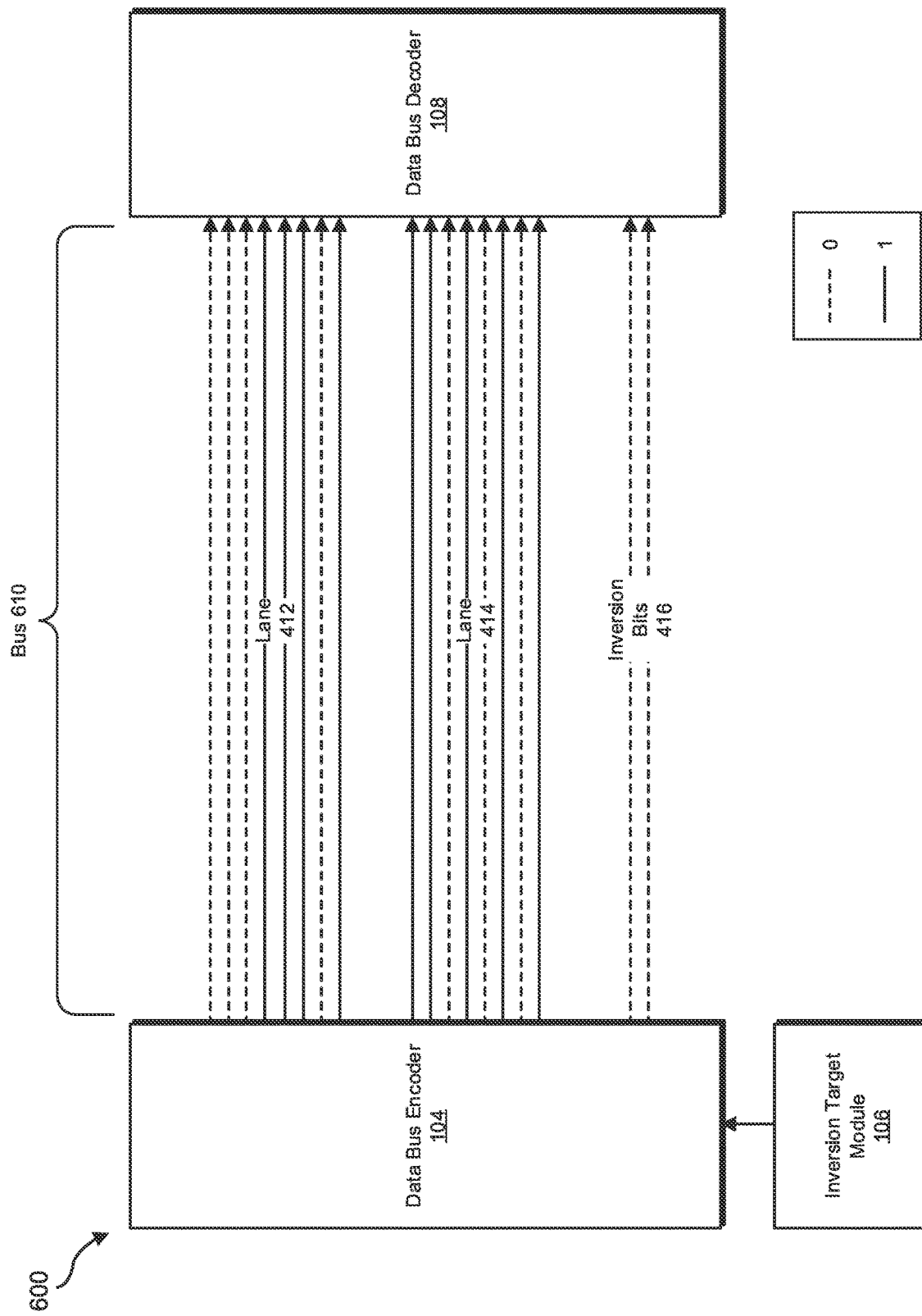
FIG. 6 is a diagram of an example multi-lane data bus state subsequent to that of FIG. 5.
Figure 7:
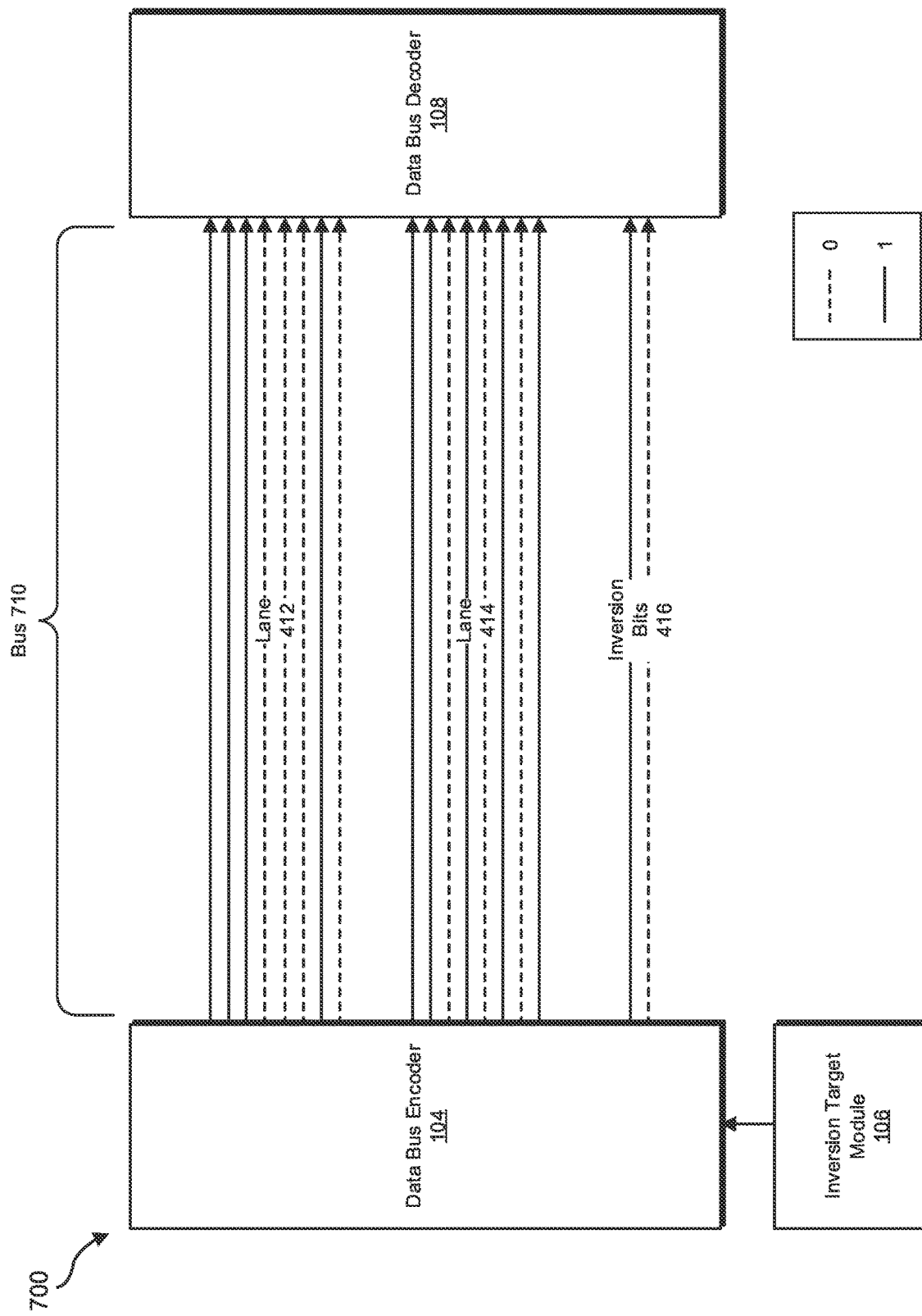
FIG. 7 is a diagram of another example multi-lane data bus state subsequent to that of FIG. 5.
Figure 8:
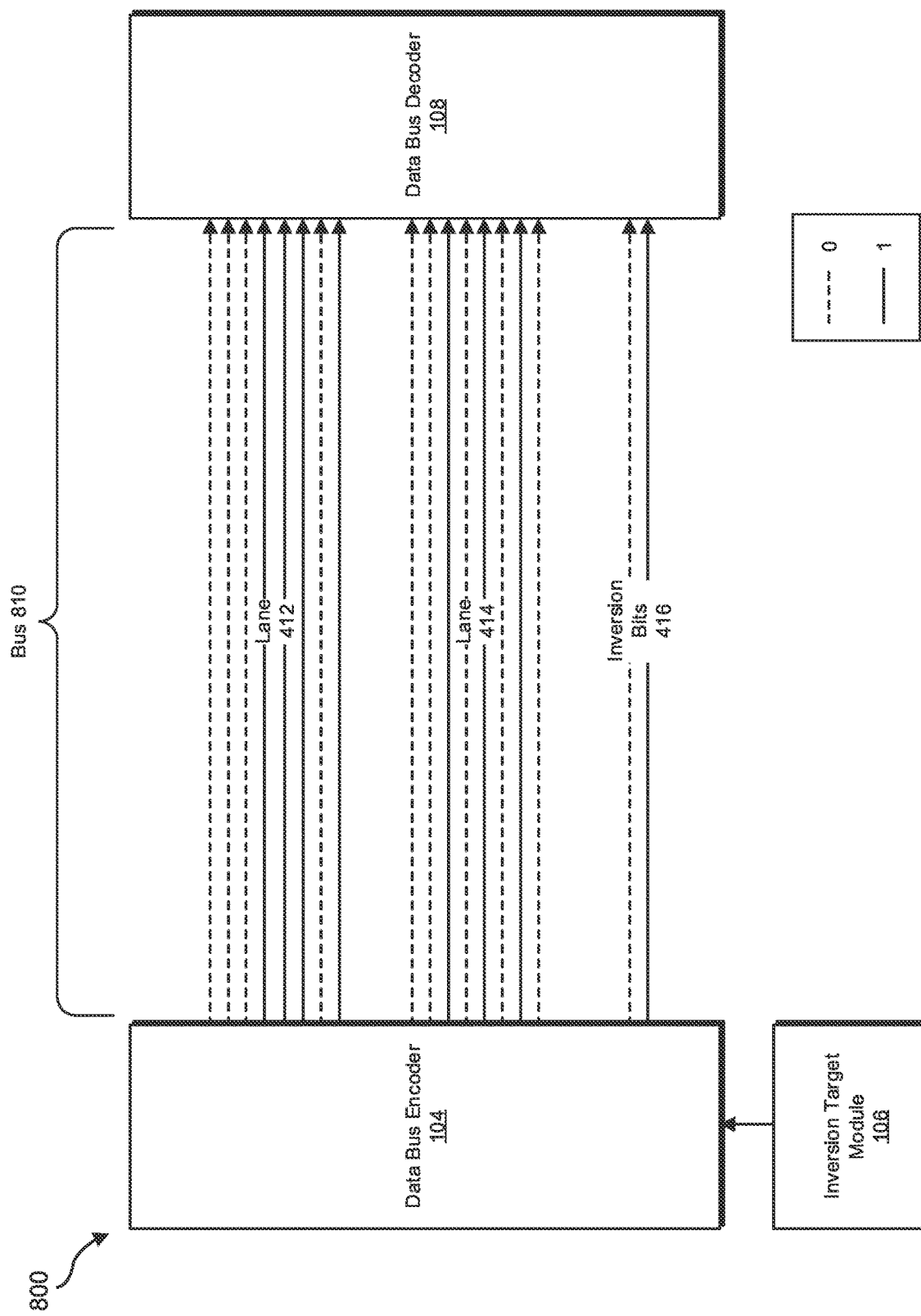
FIG. 8 is a diagram of another example multi-lane data bus state subsequent to that of FIG. 5.

FIGS. 6-8 are diagrams of a cycle immediately subsequent to that of FIG. 5.

FIG. 6 is a diagram of an example multi-lane data bus state subsequent to that of FIG. 5 in which the target toggle rate window is 75-100%. As can be seen, inversion target module 106 does not set either of inversion bits 416 (thus, the data in bus 610 is the same as if it hadn't been encoded). This results in 6 bits of lane 412 being toggled with respect to the previous cycle depicted in FIG. 5, and 7 bits of lane 414 being toggled, making a total of 13/16 bits being toggled, or an average toggle rate of 81.25%.

FIG. 7 is a diagram of another example multi-lane data bus state subsequent to that of FIG. 5 in which the target toggle rate window is 50-75%. As can be seen, inversion target module 106 sets the inversion bit for lane 412 but not the inversion bit for lane 414. This results in 2 bits of lane 412 being toggled with respect to the previous cycle depicted in FIG. 5, and 7 bits of lane 414 being toggled, making a total of 9/16 bits being toggled, or an average toggle rate of 56.25%.

FIG. 8 is a diagram of another example multi-lane data bus state subsequent to that of FIG. 5 in which the target toggle rate window is 25-50%. As can be seen, inversion target module 106 does not set the inversion bit for lane 412 but sets the inversion bit for lane 414. This results in 6 bits of lane 412 being toggled with respect to the previous cycle depicted in FIGS. 5, and 1 bits of lane 414 being toggled, making a total of 7/16 bits being toggled, or an average toggle rate of 43.75%. Because the target toggle rate window is 25-50%, the average toggle rate over many cycles is about 37.5%, which is below an expected toggle rate of 50% absent any inversion encoding. This configuration thus can save power while still preventing toggle rates from dropping below 25% and potentially causing an unacceptable level of voltage droop.

Figure 9:
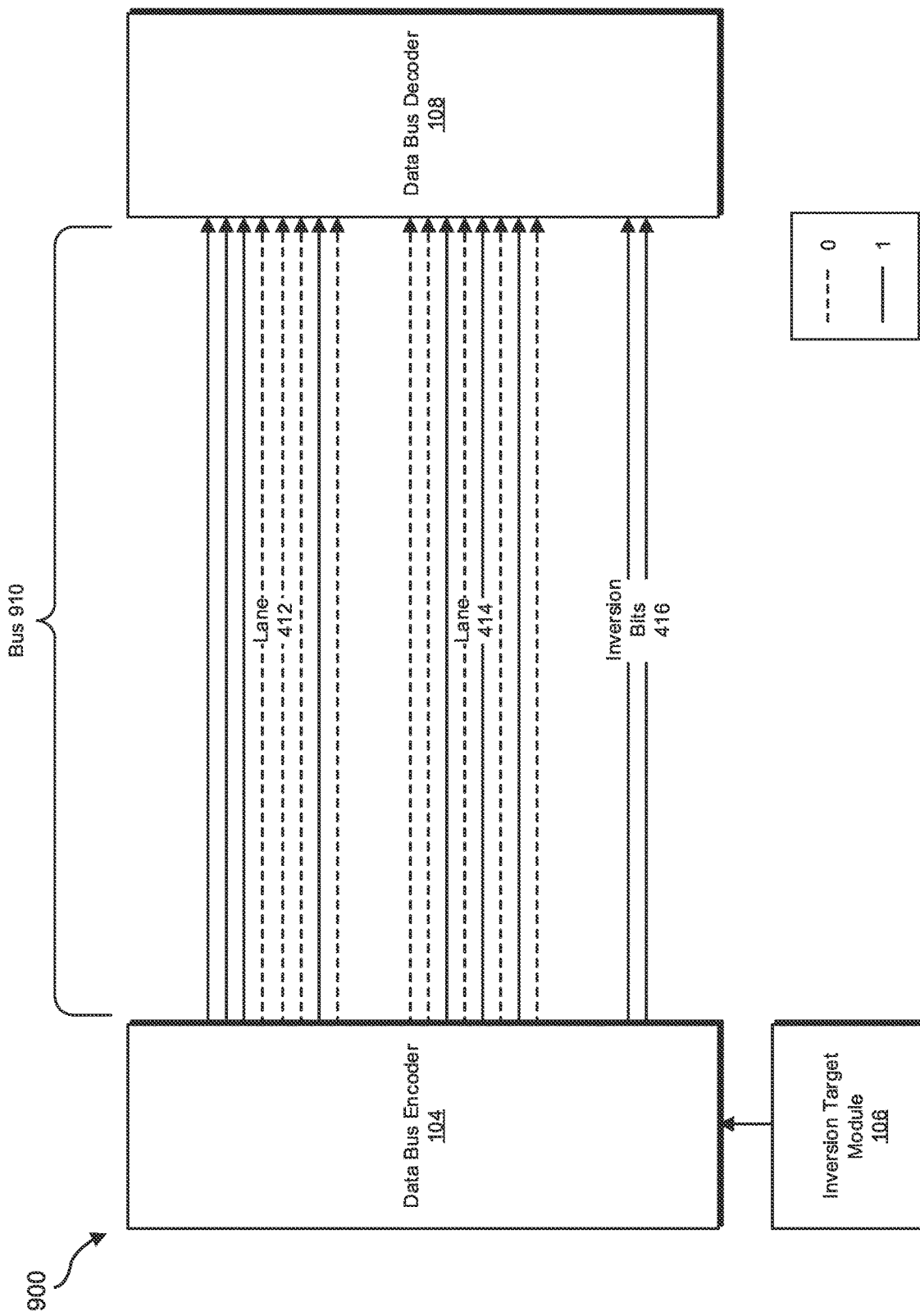
FIG. 9 is a diagram of another example multi-lane data bus state subsequent to that of FIG. 5.

FIG. 9 is a diagram of another example multi-lane data bus state subsequent to that of FIG. 5 in which the target toggle rate window is 0-25%. As can be seen, inversion target module 106 sets both of inversion bits 416. This results in 2 bits of lane 412 being toggled with respect to the previous cycle depicted in FIG. 5, and 1 bit of lane 414 being toggled, making a total of 3/16 bits being toggled, or an average toggle rate of 18.75%.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method for multi-lane data bus inversion comprising:
   receiving data for transmission via a plurality of data lanes, each data lane corresponding to one of a plurality of inversion bits;
   for each of one or more permutations of the plurality of inversion bits, calculating an average toggle number corresponding to a number of bits across the plurality of data lanes set to toggle with respect to a previous transmission;
   selecting a permutation from the one or more permutations having the corresponding average toggle number within a target toggle rate window defined by a minimum toggle rate and a maximum toggle rate;
   for each data lane within the plurality of data lanes, applying the corresponding inversion bit to each bit within the data lane based on the selected permutation; and
   dynamically adjusting the target toggle rate window.

2. The method of claim 1, wherein the minimum toggle rate is greater than zero.

3. The method of claim 1, wherein the maximum toggle rate is less than or equal to about a 50 percent toggle rate.

4. The method of claim 3, wherein implementation of the maximum toggle rate reduces power consumption of a data bus.

5. The method of claim 3, wherein the maximum toggle rate reduces voltage droop of a data bus relative to a data bus inversion pattern corresponding to a use of one or fewer inversion bits.

6. The method of claim 1, wherein the minimum toggle rate is a 25 percent toggle rate and the maximum toggle rate is a 50 percent toggle rate.

7. The method of claim 1, wherein the plurality of inversion bits comprises exactly two inversion bits.

8. An apparatus for multi-lane data bus inversion comprising:
   a data bus encoder configured to:
     receive data for transmission via a plurality of data lanes, each data lane corresponding to one of a plurality of inversion bits; and
   an inversion target circuit configured to:
     for each of one or more permutations of the plurality of inversion bits, calculate an average toggle number corresponding to a number of bits across the plurality of data lanes set to toggle with respect to a previous transmission;
     select a permutation from the one or more permutations having the corresponding average toggle number within a target toggle rate window defined by a minimum toggle rate and a maximum toggle rate; and
     dynamically adjust the target toggle rate window;
   wherein the data bus encoder is further configured to, for each data lane within the plurality of data lanes, apply the corresponding inversion bit to each bit within the data lane based on the selected permutation.

9. The apparatus of claim 8, wherein the minimum toggle rate is greater than zero.

10. The apparatus of claim 8, wherein the maximum toggle rate is less than or equal to about a 50 percent toggle rate.

11. The apparatus of claim 10, wherein implementation of the maximum toggle rate reduces power consumption of a data bus.

12. The apparatus of claim 10, wherein the inversion target circuit is further configured to reduce voltage droop of a data bus relative to a data bus inversion pattern corresponding to a use of one or fewer inversion bits.

13. The apparatus of claim 8, wherein the minimum toggle rate is a 25 percent toggle rate and the maximum toggle rate is a 50 percent toggle rate.

14. The apparatus of claim 8, wherein the plurality of inversion bits comprises exactly two inversion bits.

15. The apparatus of claim 8, further comprising a data bus decoder that decodes each data lane within the plurality of data lanes according to the corresponding inversion bit.

16. A system for multi-lane data bus inversion, the system comprising:
 a data bus;
 a data bus encoder, wherein the data bus encoder is configured to:
  receive data for transmission via a plurality of data lanes, each data lane corresponding to one of a plurality of inversion bits; and
 an inversion target circuit configured to:
  for each of one or more permutations of the plurality of inversion bits, calculate an average toggle number corresponding to a number of bits across the plurality of data lanes set to toggle with respect to a previous transmission;
  select a permutation from the one or more permutations having the corresponding average toggle number within a target toggle rate window defined by a minimum toggle rate and a maximum toggle rate, wherein the data bus encoder is further configured to, for each data lane within the plurality of data lanes, apply the corresponding inversion bit to each bit within the data lane; and
  dynamically adjust the target toggle rate window;
 a data bus decoder that decodes each data lane within the plurality of data lanes according to the corresponding inversion bit; and
 at least one transmitter and at least one receiver, wherein the at least one transmitter transmits the data for transmission to the at least one receiver.

17. The system of claim 16, wherein the minimum toggle rate is greater than zero.

* * * * *